United States Patent [19]
Lipkin et al.

[11] Patent Number: 6,131,165
[45] Date of Patent: Oct. 10, 2000

[54] PERMIT FOR CONTROLLING ACCESS TO SERVICES IN PROTECTED MEMORY SYSTEMS

[75] Inventors: Efrem Lipkin, Berkeley; Theodore C. Goldstein, Palo Alto, both of Calif.

[73] Assignee: Sun Microsystems, Inc., Palo Alto, Calif.

[21] Appl. No.: 09/099,579

[22] Filed: Jun. 18, 1998

[51] Int. Cl.[7] .................................................. G06F 11/30
[52] U.S. Cl. ............................................................. 713/201
[58] Field of Search .................................... 713/200, 201

[56] References Cited

U.S. PATENT DOCUMENTS

| | | | |
|---|---|---|---|
| 5,649,099 | 7/1997 | Theimer et al. | 395/187.01 |
| 5,677,952 | 10/1997 | Blakley et al. | 380/4 |
| 5,692,047 | 11/1997 | McManis | 380/4 |
| 5,974,549 | 10/1999 | Golan | 713/200 |
| 6,012,067 | 1/2000 | Sarkar | 707/103 |
| 6,023,794 | 2/2000 | Curtis | 713/200 |
| 6,047,377 | 4/2000 | Gong | 713/201 |

FOREIGN PATENT DOCUMENTS 0 813 133 12/1997 European Pat. Off. .

OTHER PUBLICATIONS

Tanenbaum, et al., "Experiences with the AMOEBA Distributed Operating System," Communications of the ACM, Dec. 1990, vol. 33, No. 12, pp. 46–63.

Gritzalis S et al: "Security Issues Surrounding Programming Languages for Mobile Code: JAVA rm vs. Safe–Tcl" Operating Systems Review vol. 32, No. 2, Apr. 1, 1998 (1998–04–01), pp. 16–32, XPOOO766954 p. 19, left–hand column, paragraph 1; p. 22, left–hand column, paragraph 4; p. 26, right–hand column, paragraph 2; p. 28 left–hand column, paragraph 1, right–hand column, paragraph 2.

Wallach D S et al: "Extensible security architectures for Java " Proceedings of the ACM Symposium on operating systems principles, 1997, pp. 1–26 14, XP002101681 p. 5, line 7—P. 7, line 11; p. 8, line 9–p. 10, line 13; p. 14, line 1–line 14.

(List continued on next page.)

*Primary Examiner*—Robert W. Beausoliel, Jr.
*Assistant Examiner*—Bryce Bonzo
*Attorney, Agent, or Firm*—Park & Vaughan LLP

[57] ABSTRACT

One embodiment of the present invention provides a method and an apparatus for controlling access to services in a protected memory system. The method makes use of a permit, which includes an access control mechanism that resides in a memory space that is protected from a user of the permit. The method includes receiving a request for a service through a permit, the permit comprising an object defined within an object-oriented programming system. In response to the request, the method activates an access control mechanism within the permit. This access control mechanism controls access to the service and resides in a memory space that is protected from a user of the permit, such that the access control mechanism is triggered by invoking a method on the permit. If the access is allowed, the method accesses the service by performing an invocation on a controlled object. This controlled object includes methods to perform the service, and is otherwise protected from the user of the permit. Another variation of the above embodiment includes receiving, at a permit issuing authority, a request for the permit from an entity (such as a person, a computer program or a computer process) requiring access to the service. If the request includes valid authorization information, a permit is issued to the entity. A further variation of the above embodiment includes creating a copy of the permit and transferring the copy to an entity requiring access to the service.

32 Claims, 5 Drawing Sheets

OTHER PUBLICATIONS

N. Islam et al: "A Flexible Security Model for Using Internet Content" IBM: Developer: Java overview: Library papers, Online! Oct. 1997, (1997–10), XP002115800. IBM Thomas J. Watson Research Center Retrieved from the Internet: URL:http//www.software.ibm.com/developer/library/flexsecurity/ retrieved on Sep. 17, 1999 p. 4 introduction; figure 2; p. 7, paragraph on Java Implementation.

Blaze M et al: Decentralized Trust Management Proceedings of the 1996 IEEE Symposium on Security and Privacy, Oakland, CA May 6–8, 1996. No. SYMP. 17, May 6, 1996 pp. 164–173, XP000634842 Institute of Electrical and Electronics Engineers ISBN: 0–7803–3527–9.

Riechmann, Thomas "<eta Objects for Access Control: Extending Capability–Based Security" 1997 New Security Paradigms Workshop, ACM 1998, pp. 17–22.

Goldstein, Theodore. "The gateway Security Model in the Jaca Cemmercial Client" Sun Microsystems White Paper 1988, pp1–14.

Korba, Larry "Towards Secure Agent Distribution and Communication" Proceedings of the 32nd HAwaii International Conference on Systems Sciences, Canadian Crown 1999 pp 1–10.

Westphall, Carla. "Authorization Schemes for LArge–Scale Systems based on Java, Corba, and Web Security Models". IEEE 1999.

PERMIT FOR CONTROLLING ACCESS TO SERVICES IN PROTECTED MEMORY SYSTEMS

BACKGROUND

The present invention relates to protection mechanisms in computer systems. More specifically, the present invention relates to a method and an apparatus for controlling access to services provided by other applications in protected memory systems.

Programming languages such as the Java™ programming language (developed by SUN Microsystems, Inc. of Palo Alto, Calif.) and associated supporting interfaces presently provide a reliable and secure infrastructure to support the transfer of an application across a computer network, and to run the application on a wide range of computing platforms. Because of developments such as Java, it is becoming increasingly common to load an application, such as a Java applet, from a remote server onto a local machine, and to execute the application on the local machine.

However, present computing systems are not designed to allow computer applications from different vendors to interact with each other in a controlled way so that the applications can work together to accomplish a given task. One problem in doing so is that application vendors typically want to control the way in which these interactions take place. For example, it may be useful for a tax application to access capital gains information from a home brokerage application. However, the home brokerage application needs to protect the privacy of the customer's portfolio. Hence, the tax application cannot be given unrestricted access portfolio data from the home brokerage application.

Historically, the task of controlling accesses to services in computer systems has been handled through hardware mechanisms, such as hardware capabilities systems. However, such special-purpose hardware is not present on all computing platforms. Consequently, it is not practical to use such hardware to control access to services for portable applications, such as a Java™ applet, which is designed to operate across a wide range of computing platforms.

SUMMARY

One embodiment of the present invention provides a method and an apparatus for controlling access to services provided by other applications. The method makes use of a permit, which includes an access control mechanism that resides in a memory space that is protected from a user of the permit. The method includes receiving a request for a service through a permit, the permit comprising an object defined within an object-oriented programming system. In response to the request, the method activates an access control mechanism within the permit.

This access control mechanism controls access to the service and resides in a memory space that is protected from a user of the permit, such that the access control mechanism is triggered by invoking a method on the permit. If the access is allowed, the method accesses the service by performing an invocation on a controlled object. This controlled object includes methods to perform the service, and is otherwise protected from the user of the permit. Another variation of the above embodiment includes receiving, at a permit issuing authority, a request for the permit from an entity (such as a person, a computer program or a computer process) requiring access to the service. If the request includes valid authorization information, a permit is issued to the entity. A further variation of the above embodiment includes creating a copy of the permit and transferring the copy to an entity requiring access to the service.

Thus, the present invention provides a method for controlling access to a service provided by another application. This method does not rely on hardware access control mechanisms, and hence can be employed by a portable application across a wide range of computing platforms.

BRIEF DESCRIPTION OF THE FIGS.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Distributed Computer System

Figure 1A:
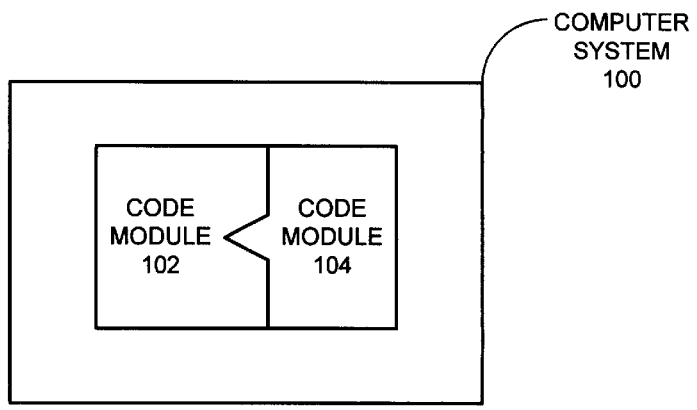
FIG. 1A illustrates code modules working together within computer system in accordance with an embodiment of the present invention.

FIG. 1A illustrates code modules 102 and 104 working together within computer system 100 in accordance with an embodiment of the present invention. In order to work with code module 104, code module 102 requests services from code module 104. Similarly, in order to work with code module 102, code module 104 requests services from code module 102. Access services between modules 102 and 104 is controlled through the permit structure described in more detail with reference to FIGS. 3–5 below.

For purposes of this detailed description, a service is a function made available by a first application to other applications. This function may provide the other applications with access to data or to computational resources from the first application. A protected memory system is a system that facilitates protection of selected regions of memory from an application running on the system.

Figure 1B:
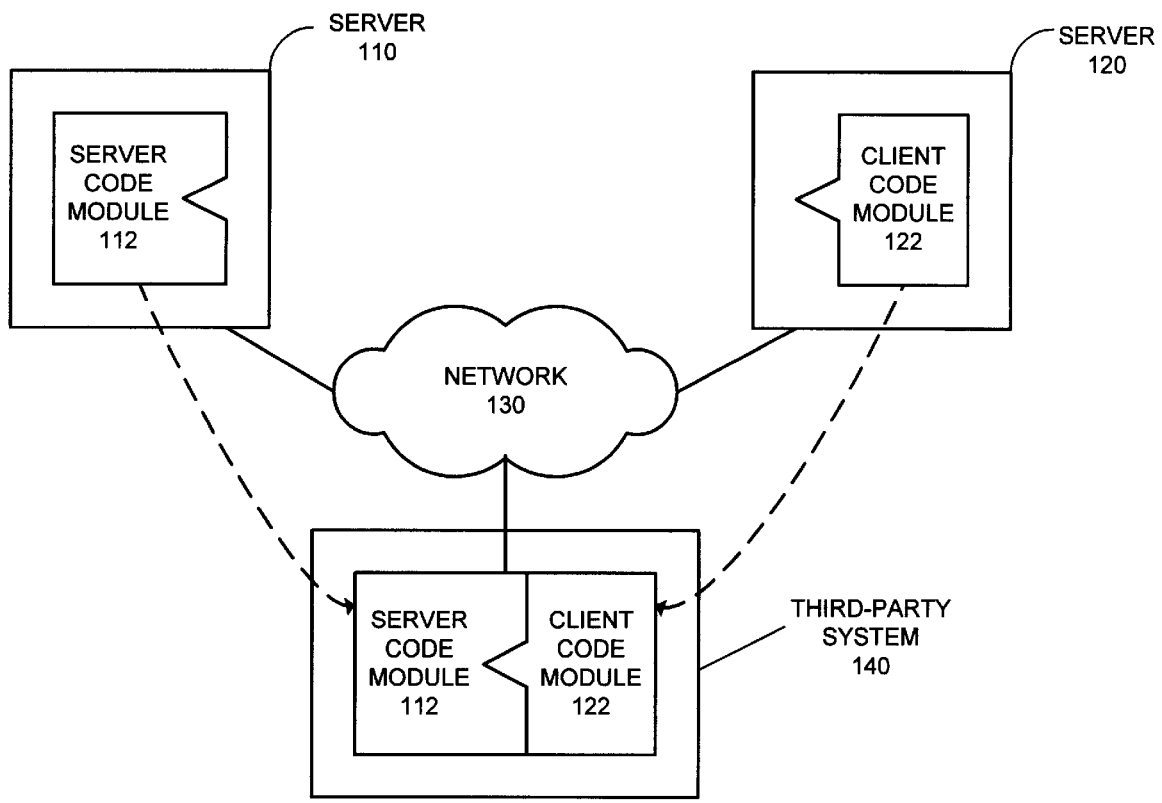
FIG. 1B illustrates a number of computer nodes coupled together through a network in accordance with an embodiment of the present invention.

FIG. 1B illustrates how the present invention can be used in a client-server computer context in which a number of computer nodes coupled together through a network 130 in accordance with an embodiment of the present invention. In FIG. 1, servers 110 and 120 are coupled to third-party system 140 through network 130. Network 130 generally refers to any type of wire or wireless link between computers, including, but not limited to, a local area network, a wide area network, or a combination of networks. In one embodiment of the present invention, network 130 includes the Internet. Servers 110 and 120 can be any nodes on a computer network including a mechanism for servicing requests from a client for computational or data storage resources. Third-party system 140 may be any node a computer network communicating with servers 110 and 120 that is able to download code and/or data from servers 110 and 120.

In the embodiment illustrated in FIG. 1, server 110 contains server code module 112, and server 120 contains client code module 122. Server code module 112 and client code module 122 include modular pieces of code that can operate together on third-party system 140. The dashed lines in FIG. 1 represent server code module 112 and client code module 122 being downloaded onto third-party system 140 across network 130. This downloading process can take place in a number of ways. In one embodiment of the present invention, server 110 includes a web site that can be accessed by a user on third-party system 140 to download server code module 112 onto third-party system 140. Correspondingly, server 120 includes a web site that can be accessed by a user on third-party system 140 to download client code module 122 into third-party system 140. In another embodiment, server code module 112 and client code module 122 are not downloaded across network 130. Instead, they are transferred from servers 110 and 120, respectively, to third-party system 140 by way of computer storage media, such as a computer disk.

Once server code module 112 and client code module 122 are located on third-party system 140, they can be integrated to work together as is illustrated in FIG. 1. For example, in providing a service to client code module 122, server code module 112 might retrieve data from a database for client code module 122. Alternatively, server code module 112 might perform a computational operation for client code module 122. This integration process may involve determining whether client code module 122 has been conferred the right to access services from server code module 112. In the reverse direction, this process may involve determining whether server code module 112 has been conferred the right to access services from client code module 122.

Process of Accessing a Service

Figure 2:
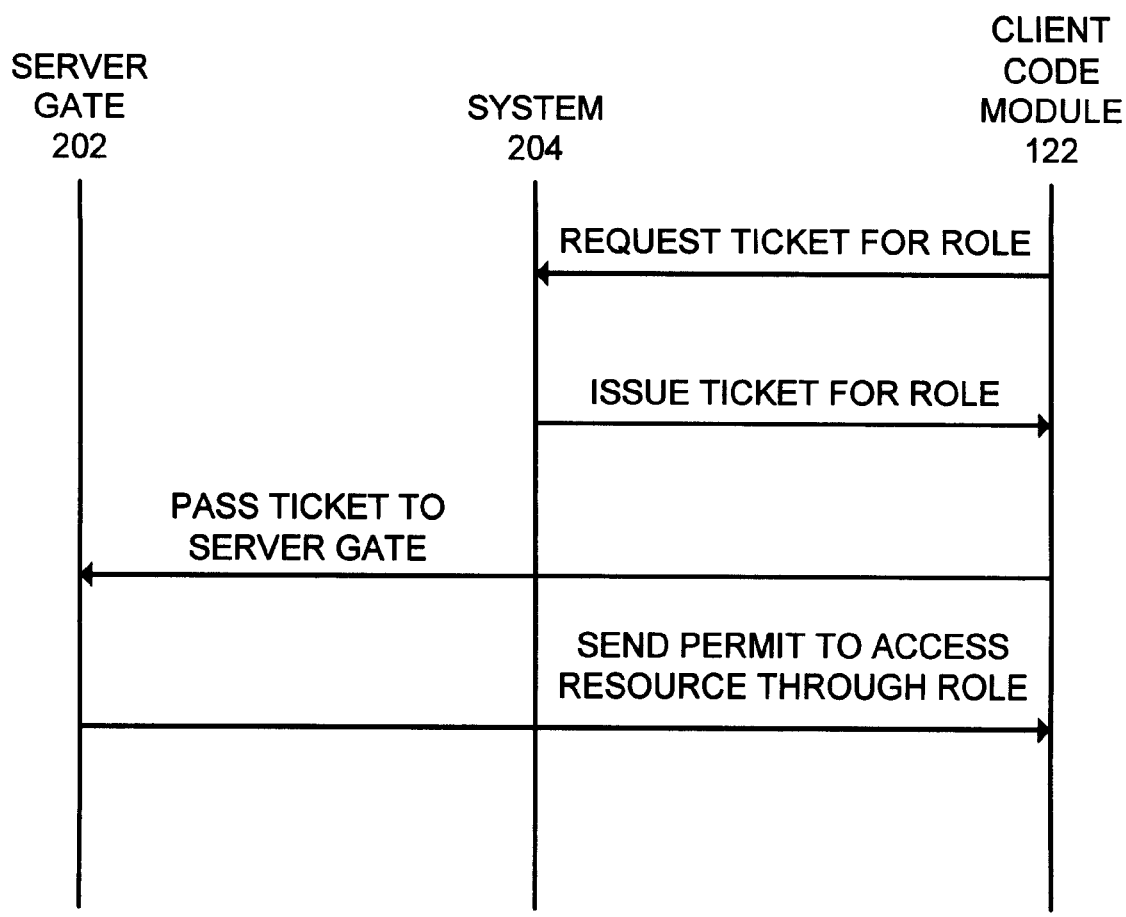
FIG. 2 illustrates the process of accessing a service in accordance with an embodiment of the present invention.

FIG. 2 illustrates the process of accessing a service in accordance with an embodiment of the present invention. FIG. 2 illustrates interactions between server gate 202, system 204 and client code module 122 (from FIG. 1). Note that the process for accessing a service illustrated in FIG. 2 represents only one possible method of obtaining access to a service. In general, the present invention applies to any pieces of code working together in a computer system. Server gate 202 is a mechanism that provides permits to properly authorized requesters.

For purposes of this detailed description, a permit is a token held by an entity, which allows the entity to access a service. In one embodiment of the present invention, a permit includes an object defined within an object oriented programming system that facilitates accesses to a collection of services.

Server gate 202 includes an access control mechanism that controls access to services provided by server code module 112 (from FIG. 1). This access control mechanism can require varying levels of authentication from a requester of a permit. In one embodiment of the present invention, server gate 202 is located within server code module 112 on third-party system 140. In another embodiment, server gate 202 is located within server 110 itself, and is accessed via communications across network 130. System 204 includes a mechanism for establishing that client code module 122 is properly authorized to access services provided by server code module 112. To this end, system 204 is implemented in a number of ways. In one embodiment, system 204 is implemented by code that is part of third-party system 140. In another embodiment, system 204 may be implemented as part of server code module 112 within third-party system 140.

The process illustrated in FIG. 2 operates as follows. Client code module 122 is assumed to already exist within third-party system 140. In order to access a desired service, client code module 122 requests a "ticket" for a "role" to access a collection of services from server code module 112. A role defines a set of operations to be performed by server code module 112. Certain roles may be more limited than other roles. For example, if server code module 112 maintains a computer file system, one role may include only the operation of reading a file from the file system. Another more powerful role may include the operations of reading, writing and deleting files from the file system.

In response to the request, system 204 examines client code module 122, to determine if client code module 122 includes proper authorization for the role. In one embodiment of the present invention, this examination includes examining a certificate chain. This process is described in more detail in a co-pending patent U.S. application by the same inventor as the instant application, entitled "Controlling Access to Services Between Modular Applications," Serial No. 09/106,567, which is hereby incorporated by reference in order to describe this process.

If client code module 122 is properly authorized for the role, system 204 issues a ticket for the role, and this ticket is given to client code module 122. Next, client code module 122 passes the ticket to server gate 202. Server gate 202 checks the ticket to ensure that the ticket is valid. If it is valid, server gate 202 sends a permit for the service to client code module 122. This permit allows client code module 122 to access the services defined by the role. In one embodiment of the present invention, this permit is an object defined within an object-oriented programming system. This object allows client code module 122 to perform a set of methods that comprise the role. After the permit is sent, server gate 202 invalidates the ticket, so that it cannot be used again. Since client code module 122 remains in possession of the permit, client code module 122 will be able to access services using the permit, and hence, no longer needs the ticket.

Permit Object

Figure 3:
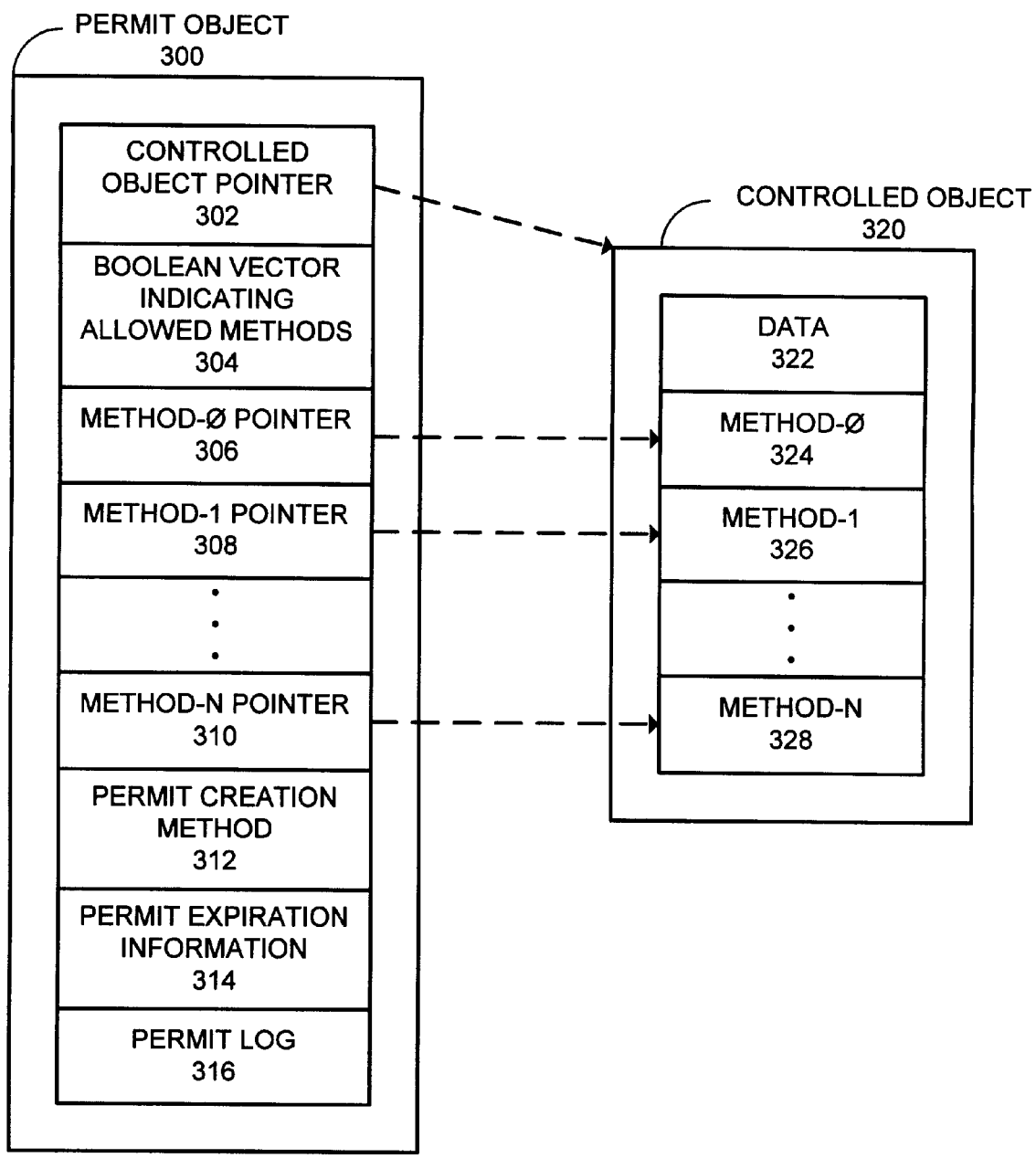
FIG. 3 illustrates the structure of a permit object and a controlled object 320 in accordance with an embodiment of the present invention.

FIG. 3 illustrates the structure of a permit object 300 and controlled object 320 in accordance with an embodiment of the present invention. Permit object 300 is typically held by a client code module, such as client code module 122 (from FIG. 1), which requires access to services provided by a server code module, such as server code module 112 (from FIG. 1). Server code module 112 maintains controlled object 320, which contains code and data used to implement the services. Note that the embodiment illustrated in FIG. 3 is implemented through objects defined within an object-oriented programming system. However, the invention is not limited to object-oriented programming systems.

Permit object 300 includes a number of components including controlled object pointer 302, boolean vector 304, method-0 pointer 306, method-1 pointer 308, method-N pointer 310, permit creation method 312, permit expiration information 314 and permit log 316.

Controlled object pointer 302 points to controlled object 320, which is maintained by server code module 112, and thereby allows the holder of permit object 300 to access services associated with controlled object 320 within server code module 112. Controlled object pointer 302 is stored in a memory that area that is protected from accesses by client code module 122. Client code module 122 cannot directly read or modify controlled object pointer 302. Client code module 122 cannot access controlled object 320 directly. In order to access controlled object 320, client code module 122 must ask the system to access controlled object 320 through controlled object pointer 302. Similarly, the other data items within permit object 300 are protected so they cannot be directly read or modified by client code module 122. This memory protection ensures that client code module 122 must access services associated with controlled object 320 by asking the system to access the services. This enables the system to restrict access to the services in a manner that is specified by the permit.

As mentioned above, this type of memory protection can be provided by using the Java™ programming language and supporting interfaces. The Java™ programming language supports memory protection down to the object level. Under the Java model, the only way to access data within an object is by invoking methods supported by the object. Data within an object is otherwise protected from memory references—through a stray pointer for example. Since the Java™ programming language can be ported across a wide range of computing platforms, this object level memory protection can be provided across a wide range of computing platforms. However, note that it may be possible to get around the protection mechanism by attacking the interface between the Java programming language and the operating system on a particular computing platform. In order to prevent this type of attack, the Java™ memory protection scheme can be extended into the hardware of a computing platform.

Boolean vector 304 contains entries corresponding to methods provided by controlled object 320. These methods implement the services associated controlled object 320. If an entry includes an "ALLOWED" value, this indicates that the holder of permit object 300 is allowed to access the corresponding method that implements the service from controlled object 320. If the entry includes a "NOT ALLOWED" value, this indicates the holder of the permit is not allowed to access the corresponding method. In this way, permit object 300 specifies which services the holder of the permit is allowed to access. Since boolean vector 304 is located in protected memory, a holder of permit object 300 cannot modify boolean vector 304 to gain unauthorized access to a service. Note that there are many possible ways to indicate that particular methods are not allowed. In another embodiment, methods within permit object 300 are coded to call a corresponding method in controlled object 320. Otherwise, they are coded to indicate that the method is not allowed.

The methods specified in controlled object 320 are accessible through method pointers within permit object 300. These method pointers include method-0 pointer 306, method-1 pointer 308 and method-N pointer 310. Client code module 122 must access methods 324, 326 and 328 through these method pointers 306, 308 and 310. Method-0 pointer 306 points to method-0 324 within controlled object 320. Method-1 pointer 308 points to method-1 326 within controlled object 320. Method-N pointer 310 points to method-N 328 within controlled object 320. These method pointers reside in protected memory so that client code module 122 must access the methods through the system.

In the illustrated embodiment, permit object 300 additionally includes permit creation method 312, which allows a holder of permit object 300 to create a copy of permit object 300, and to transfer the copy to another application. This allows client code module 122 to farm out a sub-task requiring services from controlled object 320 to another module. Note that permit creation method 312 allows only less powerful copies of permit object 300 to be made. In other words, copies of permit object 300 can access at most the same methods from controlled object 320, and possibly fewer methods.

Permit object 300 additionally includes permit expiration information, which specifies some type of lifespan limitation for the permit. In one embodiment, this is accomplished by specifying a certain time period during which the permit is valid. In another embodiment, this is accomplished by requiring that the system first check in a central database to see that the permit remains still valid.

Permit object 300 also includes permit log 316, which records a log of access requests to permit 300. This log can be used for security purposes to monitor how permit object 300 is being used. Alternatively, a log of access requests can be maintained within controlled object 320.

Controlled object 320 contains data 322, which is used by methods 324, 326 and 328 to implement services associated with controlled object 320. For example, data 322 may contain file system data and methods 324, 326 and 328 may specify file system operations.

Permit Creation

Figure 4:
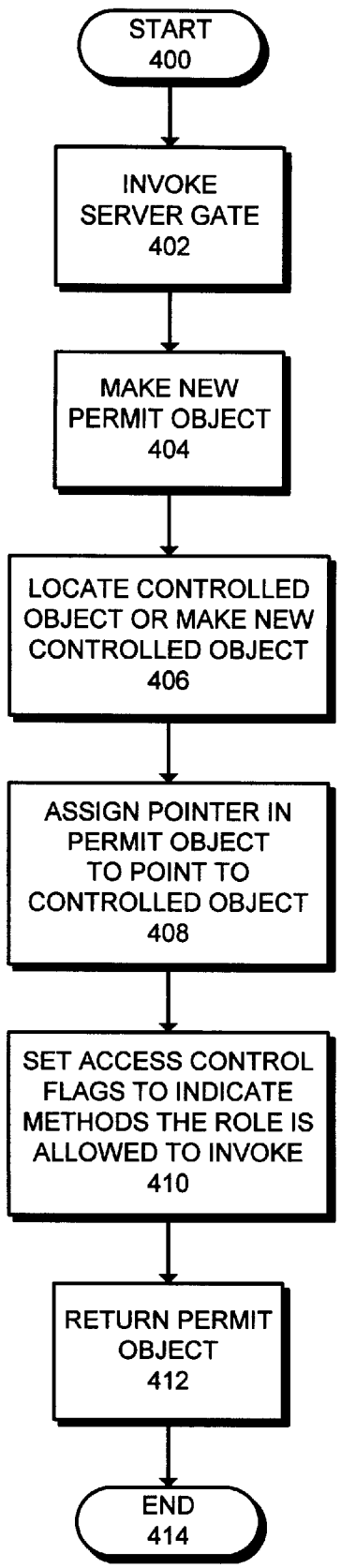
FIG. 4 is a flow chart illustrating the process of creating a permit object in accordance with an embodiment of the present invention.

FIG. 4 is a flow chart illustrating the process of creating a permit object in accordance with an embodiment of the present invention. This flow chart describes in more detail the operations performed by server gate 202, which were described previously with reference to FIG. 2 above. The system starts at state 400 and proceeds to state 402. In state 402, client code module 122 performs an invocation on server gate 202 to make a new permit. As mentioned above, this invocation includes a ticket for a role as a parameter. The system then proceeds to state 404. In state 404, server gate 202 authenticates the ticket, and if it is valid, server gate 202 makes a new permit object 300. This process may include locating a controlled object 320 to associate with permit object 300, or if necessary, making a new controlled object 320 within server code module 112. The system next proceeds to state 408. In state 408, controlled object pointer 302 (from FIG. 3) is assigned to point to controlled object 320. The system next proceeds to state 410. In state 410, the system sets access control flags (entries in boolean vector 304) to specify which methods the holder of the permit is allowed to invoke. The system next proceeds to state 410. In state 410, permit object 300 is returned to client code module 122. The system next proceeds to state 414, which is an end state.

Use of Permit Object

Figure 5:
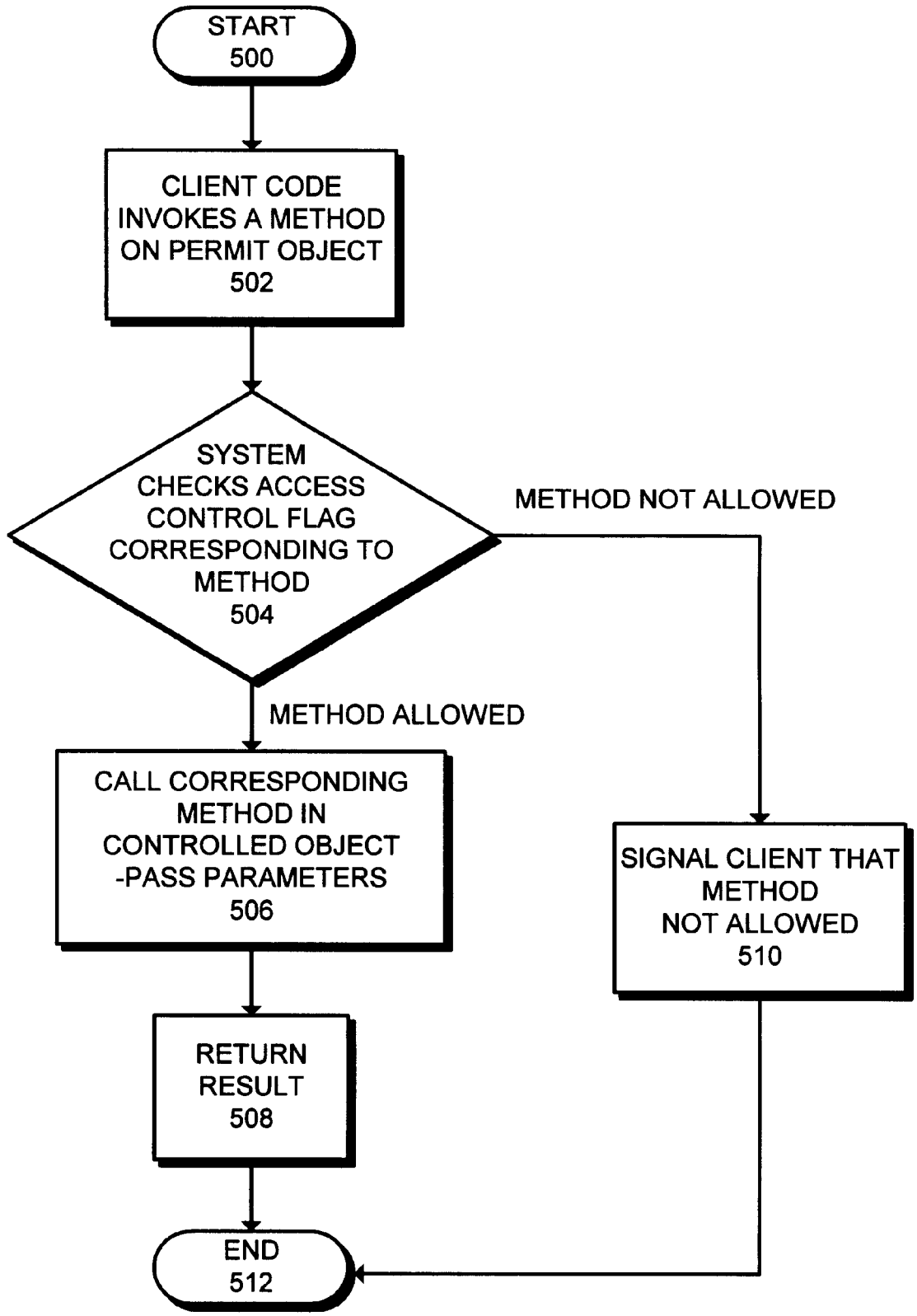
FIG. 5 is a flow chart illustrating the process of using a permit object to access a service in accordance with an embodiment of the present invention.

FIG. 5 is a flow chart illustrating the process of using a permit object to access a service in accordance with an embodiment of the present invention. The system starts at state 500 and proceeds to state 502. In state 502, client code module 122 (from FIG. 1) invokes a method on permit object 300 (from FIG. 3). The system proceeds to state 504. In state 504, the system checks access control flags corresponding to the method. This entails looking up an entry in boolean vector 304 corresponding to the invoked method. If this access control flag indicates the method is allowed, the system proceeds to state 506. Otherwise, the system proceeds to state 510.

In state 506 the access is allowed, so the system invokes the appropriate method on permit object 300, which causes a corresponding method to be invoked on controlled object 320 with the appropriate parameters. The system next proceeds to state 508. In state 508, the system waits for the invocation to complete, and then returns a result to client code module 122. The system next proceeds to state 512, which is an end state.

In state 510, the method is not allowed. In this case, the system indicates to client code module 122 that the method is not allowed. This can be done in a number of ways. In one embodiment of the present invention, the system causes an exception to occur in the execution stream of a processor performing the method invocation. In another embodiment, the system sets a global variable to indicate that the attempted use of permit object 300 failed. In yet another embodiment, the invocation to permit object 300 returns a NULL value. The above process is repeated for successive invocations on permit object 300.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention; the scope of the invention is limited only by the appended claims.

What is claimed is:

1. A method for controlling access to services in a protected memory system, comprising:
   receiving a request for a service through a permit, the permit comprising an object defined within an object-oriented programming system;
   in response to the request, activating an access control mechanism within the permit, the access control mechanism controlling access to the service and residing in a memory space that is protected from a user of the permit, such that the access control mechanism is triggered by invoking a method on the permit; and
   if the access is allowed, accessing the service by performing an invocation on a controlled object, the controlled object including a method to perform the service, and otherwise being protected from the user of the permit.

2. The method of claim 1, further comprising if the access is not allowed indicating to an entity requesting the service that the access to the service is not allowed.

3. The method of claim 1, wherein the permit is defined within the Java™ programming language and supporting interfaces.

4. The method of claim 1, wherein data protected by the permit can only be accessed through methods invoked on the permit.

5. The method of claim 1, further comprising:
   receiving, at a permit issuing authority, a request for the permit from an entity requiring access to the service; and
   if the request includes valid authorization information, issuing the permit to the entity.

6. The method of claim 1, further comprising creating a copy of the permit and transferring the copy to an entity requiring access to the service.

7. The method of claim 6, wherein the copy of the permit allows access to fewer services than the permit that it was copied from.

8. The method of claim 1, further comprising determining whether the permit has been revoked before accessing the service, and if the permit has been revoked, indicating the access is not allowed.

9. The method of claim 1, further comprising recording the access request in a log associated with the permit.

10. The method of claim 1, wherein activating the access control mechanism includes determining whether the permit has expired.

11. The method of claim 1, wherein the access control mechanism includes a pointer to the controlled object, the pointer residing in the memory space that is protected from the user of the permit.

12. The method of claim 1, wherein the access control mechanism includes a method to be invoked to perform the service, wherein if access is not allowed, the method does not perform the service, but instead indicates that access to the service is not allowed.

13. The method of claim 1, wherein the access control mechanism includes a variable associated with a method to be invoked to perform the service, wherein the variable indicates whether the access is allowed.

14. A method for controlling access to services in a protected memory system, comprising:
   receiving a request for a service through a permit, the permit comprising an object defined within an object-oriented programming system;
   in response to the request, activating an access control mechanism within the permit, the access control mechanism controlling access to the service and residing in a memory space that is protected from a user of the permit, such that the access control mechanism is triggered by invoking a method on the permit;
   if the access is allowed, accessing the service by performing an invocation on a controlled object, the controlled object including a method to perform the service, and otherwise being protected from the user of the permit; and
   if the access is not allowed indicating to an entity requesting the service that the access to the service is not allowed;
   wherein the access control mechanism includes a method to be invoked to perform the service, wherein if access is not allowed, the method does not perform the service, but instead indicates that access to the service is not allowed.

15. A computer readable storage medium storing instructions that when executed by a computer cause the computer to perform a method for controlling access to services in a protected memory system, comprising:
   receiving a request for a service through a permit, the permit comprising an object defined within an object-oriented programming system;
   in response to the request, activating an access control mechanism within the permit, the access control mechanism controlling access to the service and residing in a memory space that is protected from a user of the permit, such that the access control mechanism is triggered by invoking a method on the permit; and
   if the access is allowed, accessing the service by performing an invocation on a controlled object, the controlled object including a method to perform the service, and otherwise being protected from the user of the permit.

16. An apparatus for controlling access to services in a protected memory system, comprising:

a permit through which a user can access a service, the permit comprising an object defined within an object-oriented programming system;

an access control mechanism within the permit, the access control mechanism controlling access to the service and residing in a memory space that is protected from a user of the permit, such that the access control mechanism is triggered by invoking a method on the permit; and a request processing mechanism, in communication with the permit, that is configured to receive an access request for the service through the permit, and to activate the access control mechanism.

17. The apparatus of claim 16, wherein the access control mechanism is configured to provide access to the service by performing an invocation on a controlled object, the controlled object including a method to perform the service, and otherwise being protected from the user of the permit.

18. The apparatus of claim 16, wherein the request processing mechanism is configured to indicate that the access to the service is not allowed if the request processing mechanism determines that the access is not allowed.

19. The apparatus of claim 16, wherein the access control mechanism includes at least one method to be invoked to perform the service.

20. The apparatus of claim 16, wherein the permit is defined within the Java™ programming language and supporting interfaces.

21. The method of claim 16, wherein data protected by the permit can only be accessed through methods invoked on the permit.

22. The apparatus of claim 16, further comprising a permit creation mechanism that receives a request for the permit from an entity requiring access the service, and if the request includes valid authorization information, issues the permit to the entity.

23. The apparatus of claim 16, further comprising a permit copying mechanism that is configured to create a copy of the permit and to transfer the copy of the permit to an entity requiring access to the service.

24. The apparatus of claim 23, wherein the permit copying mechanism is configured to produce the copy of the permit that allows access to fewer services than the permit it was copied from.

25. The apparatus of claim 16, wherein the request processing mechanism is configured to determine whether the permit has been revoked before accessing the service.

26. The apparatus of claim 16, further comprising a log, associated with the permit, to record access requests.

27. The apparatus of claim 16, wherein the request processing mechanism is configured to determine whether the permit has expired.

28. An apparatus for controlling access to services in a protected memory system, comprising:

a permit means, through which a user can access a service;

an access control means, within the permit means, the access control means controlling access to the service and residing in a memory space that is protected from a user of the permit means, such that the access control means is triggered by invoking a method on the permit means; and a request processing means, in communication with the permit means, that is configured to receive an access request for the service through the permit means, and to activate the access control means.

29. A computer readable storage medium containing a data structure for controlling access to services in a protected memory system, the data structure comprising:

an access control mechanism within the data structure, the access control mechanism controlling access to the service and residing in a memory space that is protected from a user of the permit, such that the access control mechanism is triggered by invoking a method on the permit; and an access control indicator within the data structure, the access control indicator specifying services the user can access, the access control indicator being protected from modification by the user.

30. The computer readable storage medium of claim 29, wherein the access control mechanism includes a pointer to code that implements the service, the pointer residing in the memory space that is protected from the user.

31. The computer readable storage medium of claim 29, wherein the access control indicator includes a variable associated with a service, wherein the variable indicates whether access to a corresponding service is allowed.

32. A method for controlling access to services in a protected memory system, comprising:

receiving a request for a service through a permit, the permit comprising an object defined within an object-oriented programming system;

in response to the request, activating an access control mechanism within the permit, the access control mechanism controlling access to the service and residing in a memory space that is protected from a user of the permit, such that the access control mechanism is triggered by invoking a method on the permit; and if the access is allowed, accessing the service.

* * * * *